INVENTORS.
ELMER H. GREENBERG
WILLIAM B. GREENBERG
BY Robert K. Youtie

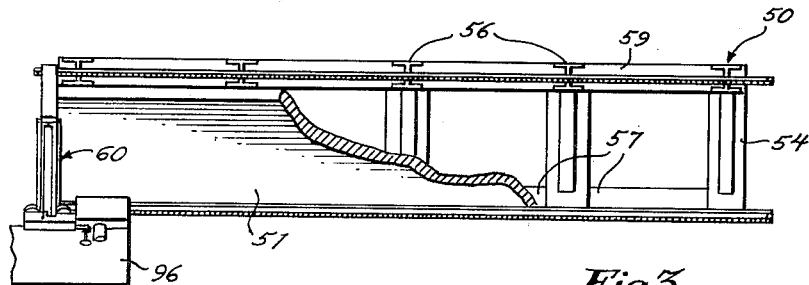
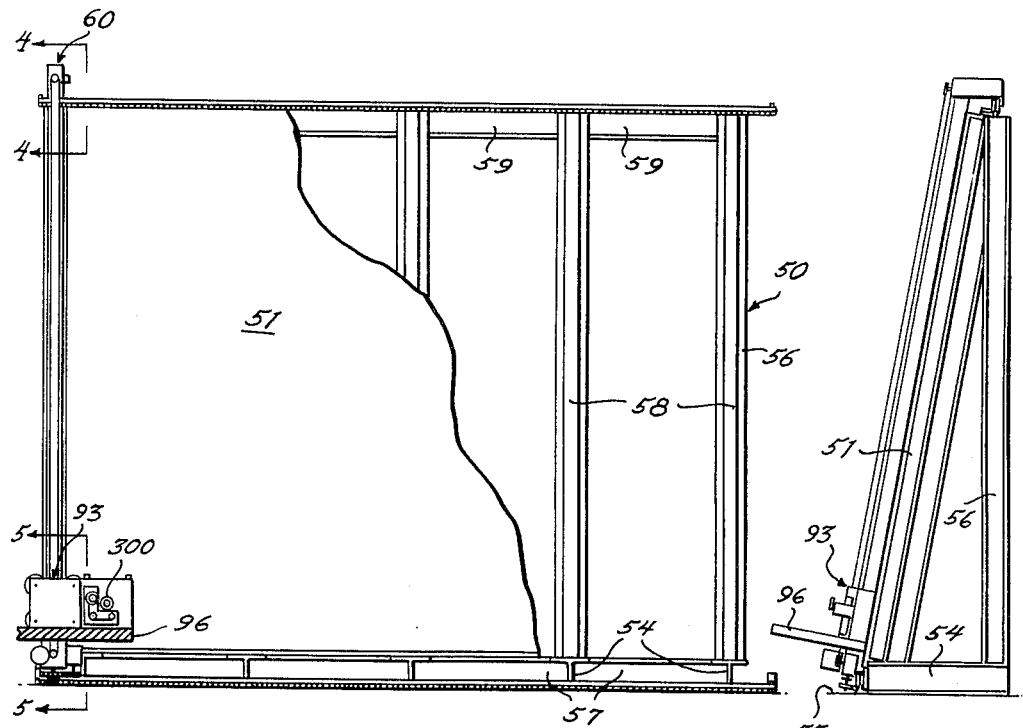
INVENTORS.
ELMER H. GREENBERG
WILLIAM B. GREENBERG
BY
Robert K. Youtie
ATTORNEY.

ATTORNEY.

Oct. 5, 1965    E. H. GREENBERG ETAL    3,209,582
APPARATUS FOR SCANNING LARGE OBJECTS WITH A TEST-UNIT PROBE
Filed May 31, 1961    8 Sheets-Sheet 5
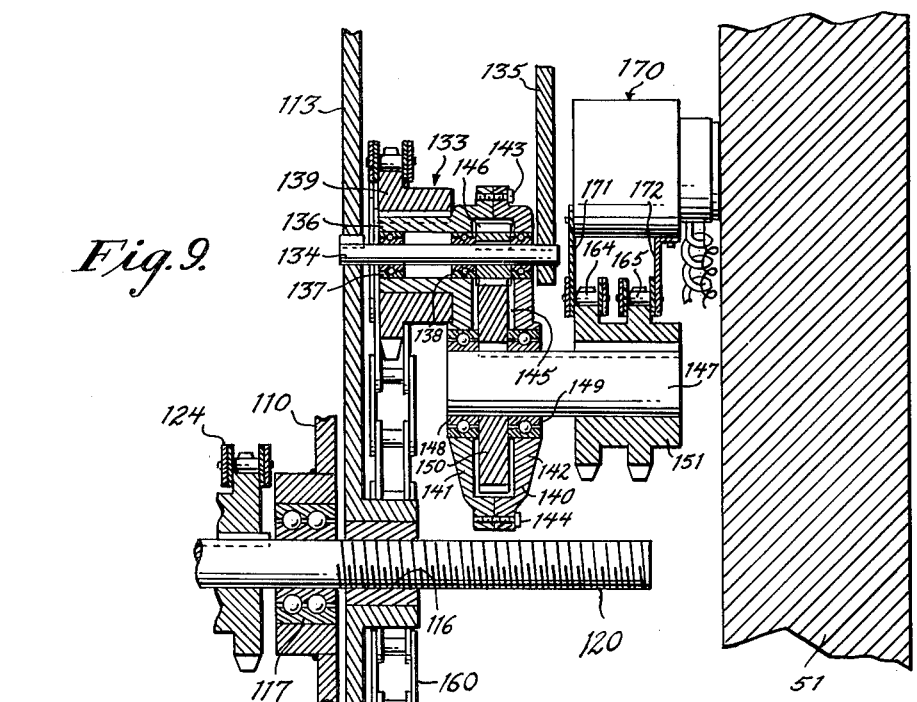
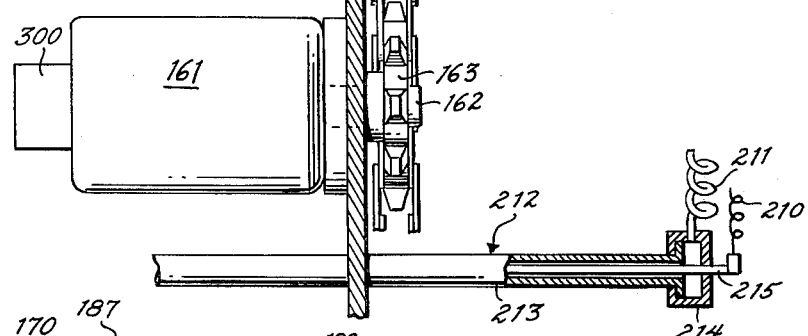
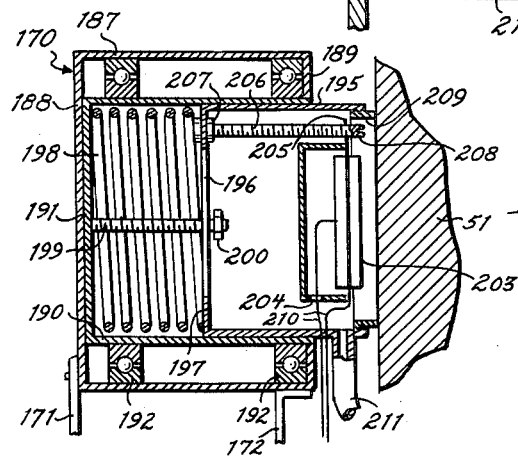
INVENTORS.
ELMER H. GREENBERG
WILLIAM B. GREENBERG
BY Robert K. Youtie
ATTORNEY.

Oct. 5, 1965     E. H. GREENBERG ETAL     3,209,582
APPARATUS FOR SCANNING LARGE OBJECTS WITH A TEST-UNIT PROBE
Filed May 31, 1961     8 Sheets-Sheet 6

INVENTORS.
ELMER H. GREENBERG
WILLIAM B. GREENBERG
BY Robert K. Youtie

ATTORNEY.

Oct. 5, 1965 E. H. GREENBERG ETAL 3,209,582
APPARATUS FOR SCANNING LARGE OBJECTS WITH A TEST-UNIT PROBE
Filed May 31, 1961 8 Sheets-Sheet 7

INVENTORS.
ELMER H. GREENBERG
BY WILLIAM B. GREENBERG
Robert K. Youtie
ATTORNEY.

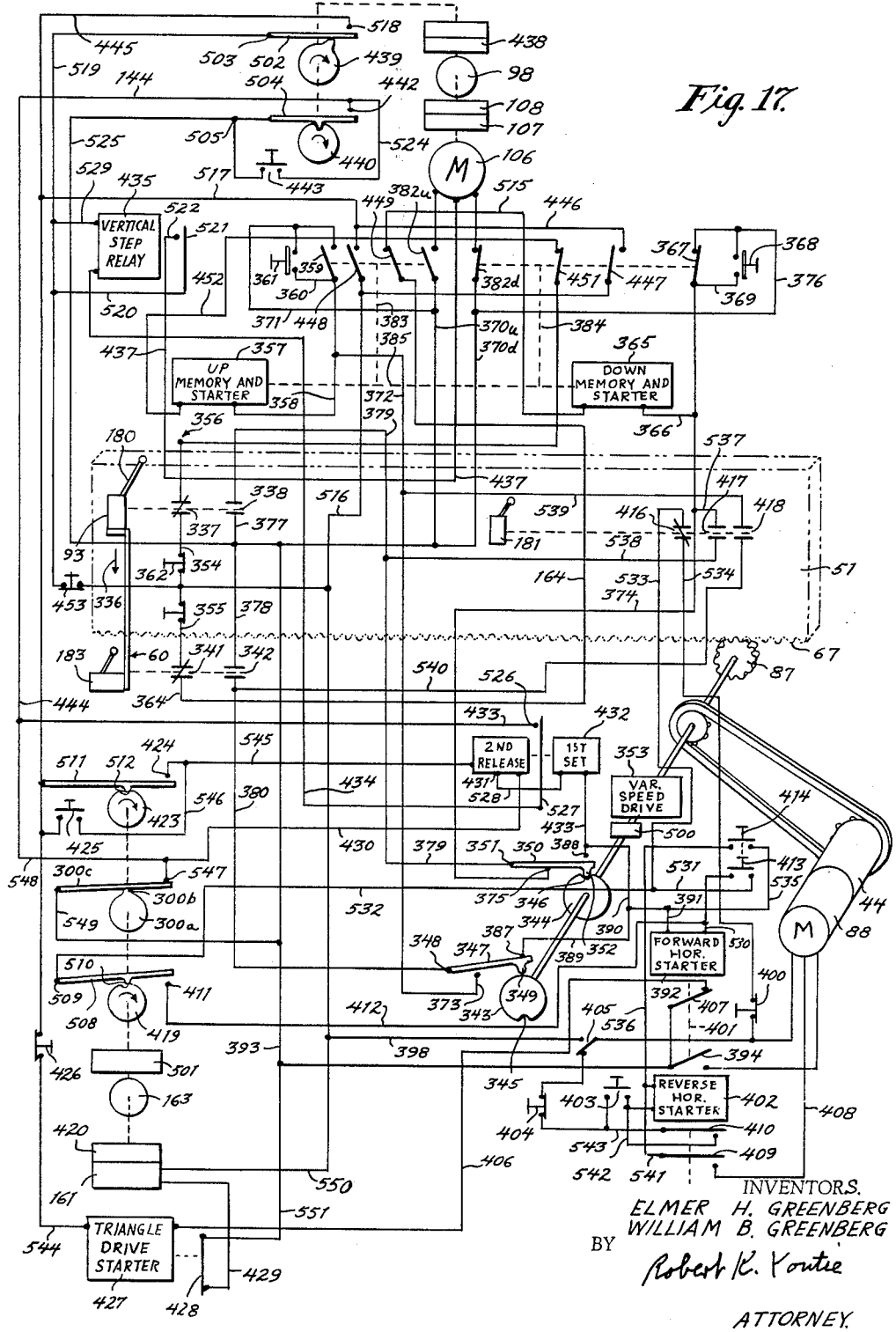

United States Patent Office 3,209,582
Patented Oct. 5, 1965

3,209,582
APPARATUS FOR SCANNING LARGE OBJECTS
WITH A TEST-UNIT PROBE
Elmer H. Greenberg, 2500 Belmont Ave., Philadelphia,
Pa., and William B. Greenberg, 1510 Brinton Park
Drive, Wynnewood, Pa.
Filed May 31, 1961, Ser. No. 120,849
6 Claims. (Cl. 73—67.8)

This invention relates generally to testing apparatus, and is especially concerned with the testing of relatively large objects.

While the apparatus of the present invention is illustrated and described hereinafter as plate-testing apparatus for large metal plates, it is understood that the invention is not limited but capable of many varied applications, all of which are intended to be comprehended herein.

It is one object of the present invention to provide testing apparatus which more accurately, efficiently and thoroughly tests articles, such as metal plates, to effect considerable savings in labor and time.

It is a more particular object of the present invention to provide apparatus for testing metal plates which is highly automatic and capable of operation in conjunction with plate-treating apparatus such as disclosed in our prior copending patent applications Serial Nos. 54,167, now Patent No. 3,103,767, and 828,141, now Patent No. 3,055,150.

It is another object of the present invention to provide a test apparatus which is capable of testing an article over a precise repeat pattern, but also providing periods of rest for a simultaneous second test.

Another object of the present invention resides in the provision of a highly unique testing-unit probe for use in the instant apparatus, which testing-unit probe is more accurate, reliable and durable throughout a long useful life.

Still another object of the present invention resides in the provision of a unique automatic electrical control means adapted for use in the instant apparatus.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a front view substantially in elevation showing test apparatus of the present invention with a plate thereon in position to test, the plate being broken away for clarity of illustration;

FIGURE 2 is an end elevational view of the apparatus of FIGURE 1;

FIGURE 3 is a top plan view of the apparatus of FIGURES 1 and 2;

FIGURE 9 is a sectional view taken substantially along the line 9—9 of FIGURE 8;

FIGURE 10 is an internal, longitudinal sectional view showing one form of test unit proper;

FIGURE 17 is a schematic illustration showing electric circuitry adapted for use with the instant apparatus.

Figure 4:
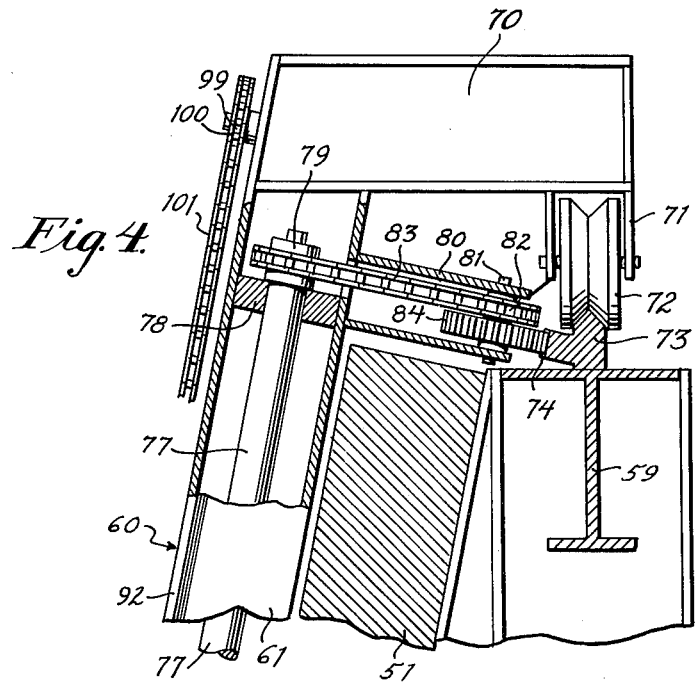
FIGURE 4 is a partial sectional view taken substantially along the line 4—4 of FIGURE 1, somewhat enlarged for increased clarity.
Figure 5:
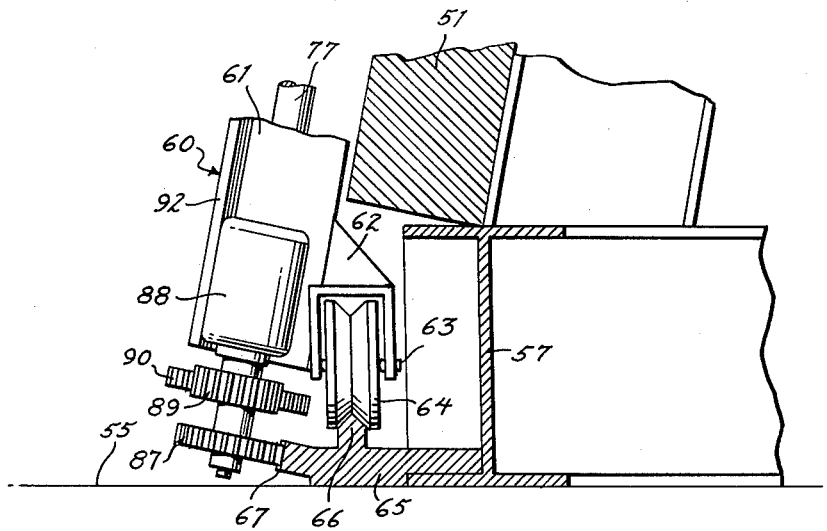
FIGURE 5 is a partial sectional elevational view taken substantially along the line 5—5 of FIGURE 1, and enlarged for clarity.

Referring now more particularly to the drawings, and specifically to FIGURES 1–3 thereof, the apparatus illustrated therein includes a support, frame or stand, generally designated 50, which is adapted to hold a large object, such as a heavy metal plate 51.

The support or stand 50 is of an open-frame construction, and may advantageously be fabricated of structural members, such as I beams or the like. The stand may include a plurality of generally horizontally disposed base members 54 arranged in parallel, side-by-side relation and adapted to be supported on a floor surface 55. Upstanding from each base member 54, at the rearward region thereof, is a generally vertical upright member 56, which members are arranged in side-by-side alignment with each other. Extending between the front regions of base members 54 are horizontally disposed frame members 57; and, a plurality of rearwardly inclined rest members 58 extend from the forward regions of the base members 54 to the upper regions of the uprights 56. Also, upper horizontal members 59 may extend between the upper ends of uprights 56. The above-recited frame members are fixedly secured together, as by welding or other suitable means to define a rigid and staunch support or stand.

The base members 54 and lower front members 57 may serve to support the lower edge of the upstanding plate 51 leaning with one face against the inclined frame members 58. The plate 51 may be placed on and removed from the stand 50 by suitable handling equipment (not shown).

Extending generally vertically, substantially entirely across the front of the frame 50 is a main carriage or working vehicle, generally designated 60. Thus, the main carriage or vehicle 60 is adapted to extend entirely across one dimension of the plate 51, and is mounted on the support 50 for movement generally horizontally or transverse of its longitudinal dimension. Specifically, the main carriage or vehicle 60 includes an elongate, longitudinally extending, generally tubular housing 61 of rectangular cross section disposed in an upwardly and rearwardly inclined direction, substantially parallel to and spaced forward of the plate 51 and supporting members 58. Fixed to the lower region of the tubular housing 61, on the rearward side thereof, is a downwardly facing journal bracket 62 carrying a generally horizontal, forwardly and rearwardly extending axle or pin 63 rotatably supporting a grooved wheel 64. The bracket 62 and its wheel 64 are located directly in front of the lower front frame members 57 so as not to obstruct proper positioning of the plate 51. Extending entirely along the lower front region of the support 50, welded or otherwise fixed to the lower front members 57 and forward regions of base members 54, and advantageously resting on the supporting surface 55, is a track 65. The track 65 includes an upstanding rail 66 horizontally coextensive with the support 50 and rollably supporting and guiding the wheel 64. Also provided on the track 66 and longitudinally coextensive therewith is a forwardly outstanding toothed rack 67.

Fixedly secured to the upper end of the tubular housing 61, above the support 50, and extending rearward over the support is a beam or arm 70, which carries on its rearward end a depending journal bracket 71 journaling a grooved wheel 72. Fixedly secured on the upper horizontal frame members 59, and horizontally coextensive with the support 50 is an upstanding track or rail 73 rotatably supporting and guiding the wheel 72 for rolling movement along the track. By this construction of lower and upper tracks or rails 66 and 73, and the wheels 64 and 72 respectively rollable along the tracks, the main carriage or vehicle 60 is mounted for horizontal movement back and forth in front of the plate 51. While only a single lower wheel 64, and a single upper wheel 72 are shown in the drawing, it is appreciated that such wheels may be provided in pairs or greater numbers, say for increased constraint, if desired.

The upper track or rail 73 is provided on its forward side with a toothed rack 74 horizontally coextensive with the rail.

Extending longitudinally of and interiorly within the tubular housing 61 is a rotatable shaft 77. The shaft 77 is suitably journaled for axial rotation, say by one or more bearings 78, see FIGURE 4. On the upper end of shaft 77 may be provided a sprocket wheel 79 for rotation with the shaft; and, a flanged structure 80 may extend generally rearward and slightly downward from proximate to the sprocket wheel 79 toward and terminating short of the rack 74. The flange structure 80 extends over the stand 50 and rotatably supports a shaft 81 extending obliquely upward and rearward substantially parallel to shaft 77 and carrying a sprocket wheel 82 in substantial alignment with the sprocket wheel 79. Trained about the sprocket wheels 79 and 82 for positive transmission therebetween is a sprocket chain 83. Also carried by the shaft 81 for rotation with the sprocket whel 82 is a spur gear 84 in meshing engagement with the rack 74.

On the lower end of shaft 77, which projects beyond the lower end of the housing 61, is carried a spur gear 87 in meshing engagement with the toothed rack 67 of track 65. Power means, such as an electric-motor variable speed reducer 88 may be fixed on one side of the housing 61, substantially parallel to the shaft 77, and provided with output gear 89 in meshing engagement with a driven gear 90 carried by the shaft 77 below the housing. By this means, powered rotation of gear 89 drives gear 90 to rotate shaft 77, which rotates gear 87 and tends to move the entire main carriage or vehicle 60 along the tracks or rails 66 and 73. Of course, rotation of shaft 77 also drives shaft 81 through chain 83, and rotates gear 84 in meshing engagement with rack 74 for additional and equalizing driving action.

The housing 61 may be externally configured or otherwise provided with longitudinally extending rails, the illustrated embodiment showing the housing as of oblate transverse cross-sectional configuration to define a pair of rails or rail formations 92 extending respectively along opposite sides of the housing. A subcarriage transducer carrier is generally designated 93 and mounted for up-and-down movement along the housing 61. The subcarriage 93 includes a generally upstanding back part 94 which may rotatably carry a pair of wheels 95 in rolling engagement with each rail formation 92 of the housing 61 to mount the subcarriage for rolling movement up and down along the housing. The subcarriage 93 may also include an outstanding platform or shelf 96 projecting generally forwardly from the lower region of the part 94. A lower stub shaft 97 projects forwardly from the lower region of housing 61, extending obliquely upward for disposition substantially normal to the housing, and carries on its forward end a sprocket wheel 98 rotatable with the stub shaft. A similar, upper stub shaft 99 projects generally forwardly and obliquely upward from an upper region of the housing 61, see FIGURE 4, disposed generally normal to the housing, and carries a rotatable sprocket wheel 100. A sprocket chain 101 is trained about the lower sprocket whel 98 and upper sprocket wheel 100, lying along the housing 61, being interposed between the latter and the back part 94 of subcarriage 93. Further, the subcarriage is connected to the chain 101, see FIGURE 6, as by end links 102 and 103 of the chain being connected to the back part 94.

A mounting bracket 105 is fixed to the lower region of the housing 61, on the side thereof opposite to the motor 88, and carries another power source or motor 106 for horizontal movement with the housing. The power source or variable drive motor 106 is located proximate to the rotary shaft 97, and the latter carries a spur gear 107 in driven meshing engagement with an output spur gear 108 of the motor 106 for driving the lower sprocket 98, chain 101, and upper sprocket 100. As the chain 101 is driven, the subcarriage or instrument carrier 93 will be moved up and down along the housing 61.

Figure 6:
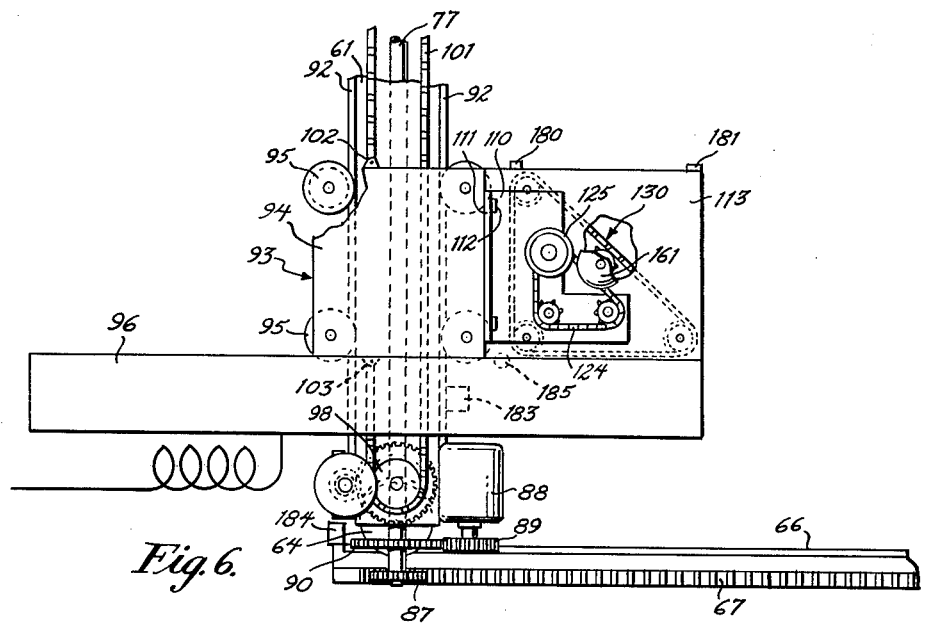
FIGURE 6 is a partial front view similar to FIGURE 1, showing elements of the apparatus in greater detail.

The forwardly outstanding platform 96 preferably extends longitudinally of the stand 50 in both directions beyond the back part 94. Projecting outward from one side of the subcarriage back part 94, and fixed thereto, is a generally upstanding plate 110 of approximate L-shaped configuration in front view, as best seen in FIGURE 6. The plate 110 serves as a mounting bracket, as will appear presently, and may include a forwardly extending flange 111 secured fast to one side of the back part 94, the right-hand side thereof as seen in front view, as by fasteners 112, or other suitable means. Arranged forward of and generally parallel to the bracket plate 110 is a transducer-mounting member or plate 113. The mounting plate 113 is provided with a plurality of triangularly arranged internally threaded through holes 114, 115 and 116. The holes 114, 115 and 116 are located in a right-triangular configuration, with the hole 115 at the juncture of the legs, the hole 114 being spaced horizontally from the hole 115, and the hole 116 being spaced vertically from the hole 115. Further, the hole 114 is located rearward of the horizontal leg of L-shaped bracket plate 110, the hole 115 being located behind the junctural region of the L-shaped bracket plate, and the hole 116 being located behind the upright region of the bracket plate. In alignment with each hole 114, 115 and 116 of the mounting plate 113, the bracket member or plate is provided with a through journal bearing, such as the antifriction bearing 117 shown in FIGURE 9. A plurality of threaded shafts 118, 119 and 120 extend respectively in threaded engagement through the threaded holes 114, 115 and 116, being journaled in the bracket plate 110, as by the journal bearing 117 and similar journal bearings in respective alignment with the openings 114 and 115 of the mounting plate 113. On the forward ends of the shafts 118, 119 and 120, forward of the bracket plate 110, are keyed sprocket wheels 121, 122 and 123, respectively. An endless sprocket chain 124 is trained about the sprocket wheels 121–123; and, a handwheel 125 is fixed on the forward end of one of the shafts 118–120, say the shaft 120. By means of the handwheel 125, the mounting plate 113 may be adjusted rearwardly away from the bracket plate 110 and forwardly toward the bracket plate for proper location with respect to a plate 51 to be tested. That is, the threaded shafts 118–120 serve as lead screws to effect said adjustment.

Carried on the rearward side of the mounting plate 113 is a patternmaking mechanism, generally designated 130. The patternmaking or motion mechanism 130 includes a plurality of substantially identical rotary units 131, 132 and 133 arranged in a right-triangular configuration similar to but larger than the triangular configuration of adjustment screws 118, 119 and 120. Further, the triangular configuration of rotary pattern units 130–133 is located in spatial correspondence with the adjustment shafts 118–120.

As best seen in FIGURE 9, the rotary pattern-motion unit 133 includes a fixed shaft 134 extending rearward from the mounting plate 113, preferably having its forward end supported in an overhanging portion or extension 135 of the mounting plate 113. Circumposed about the shaft or axle 134 is a hub 136, which is rotatably supported on the shaft by suitable bearing means, such as the antifriction bearings 137 and 138. A sprocket whel 139 is circumposed about and keyed to the hub 136 for rotation therewith.

Extending rearward beyond the sprocket wheel 139, the hub 136 is provided with a hollow arm 140 projecting radially of the shaft 134. The arm 140 is angularly swingable about the axis of shaft 134, and may advantageously be sectionally fabricated, as by a forward section 141 integral with the hub, and a rearward section 142 secured fast in facing relation with the forward section by fasteners 143 and 144 to provide an interior hollow 145 within the arm. In the hollow 145, keyed to the shaft 134 is a stationary spur gear 146, while a shaft 147 is journaled in a radially outer region of the arm 140 in bearings 148 and 149. The shaft 147 extends rearward from the arm 140 in substantial parallelism with the shaft 134 and carries interiorly of the arm a spur gear 150 for rotation with the shaft and in meshing engagement with the fixed gear 146. Thus, the fixed gear 146 defines a sun gear, while the gear 150 defines a planetary gear.

Keyed on the rearward end of the planetary shaft 147, proximate to the work 51, is a sprocket wheel 151, which is preferably of a double type having two sets of teeth. The rotary unit 131 is similar to the rotary unit 133, including a rotary sprocket 155 and a planetary sprocket 156, while the rotary unit 132 is also similar and includes a rotary sprocket 157 and a planetary sprocket 158.

An endless sprocket chain 160 is trained about the sprocket wheels 155, 139 and 157, adjacent to and on the rearward side of mounting plate 113. On the forward side of the mounting plate 113 is carried a drive motor 161, which has a shaft 162 projecting rearward rotatably through the mounting plate and carrying a drive sprocket wheel 163 in meshing engagement with the sprocket chain 160. Thus, the motor 161 is fixed on the forward side of mounting plate 113 and has its shaft extending through the mounting plate in driving relation with the chain 160.

Figure 8:
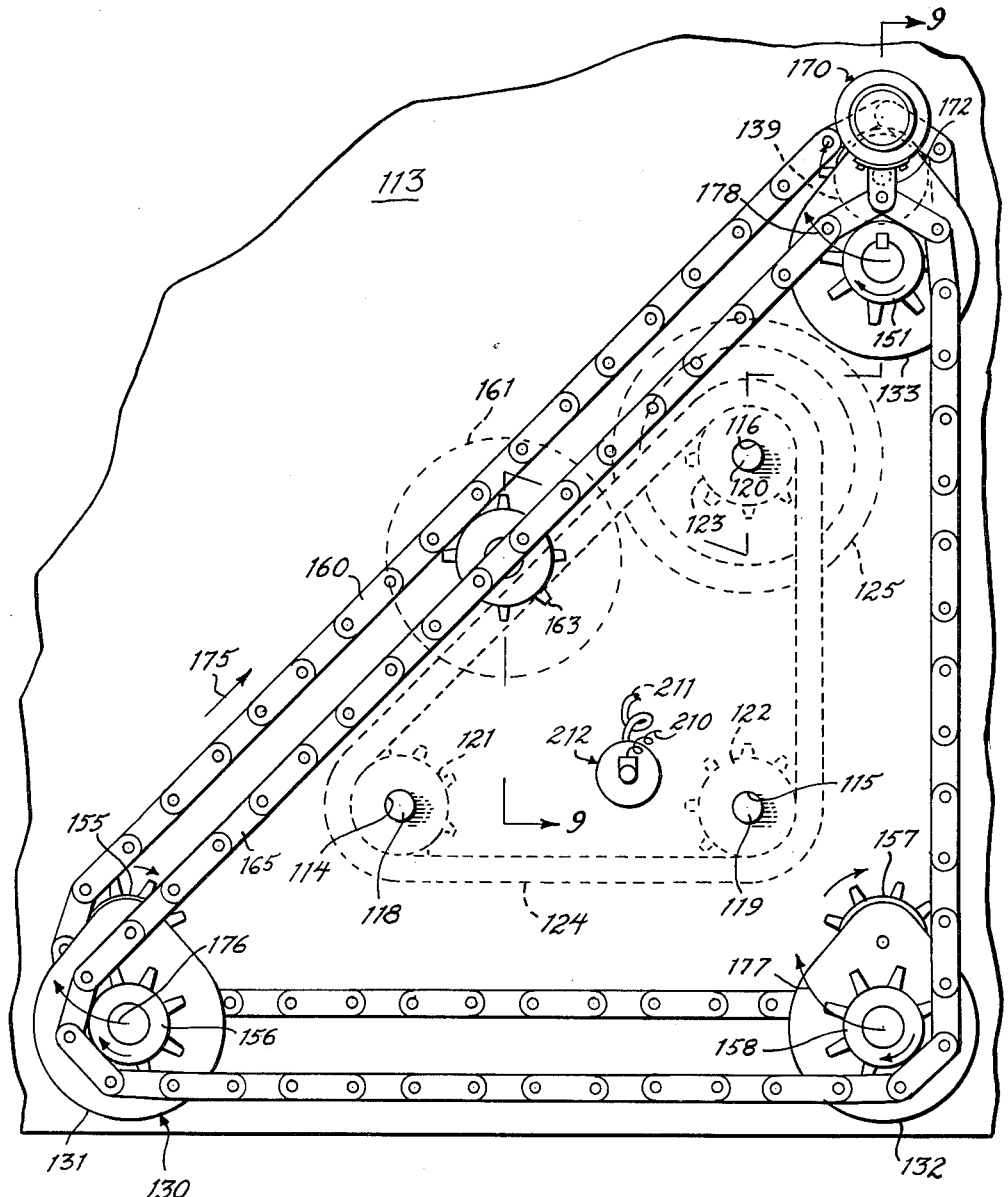
FIGURE 8 is a view taken substantially along the line 8—8 of FIGURE 7.
Figure 11:
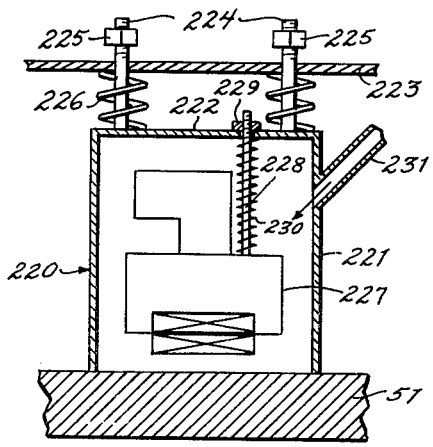
FIGURES 11–15 are internal sectional views similar to FIGURE 10 showing different embodiments of test units.

Trained about the planetary sprocket wheels 156, 151 and 158 are a pair of sprocket chains 164 and 165, which are substantially identical, defining a double sprocket chain, and which supoprt a testing head, generally designated 170. That is, the testing head 170 is located outward of the triangularly configured chains 164 and 165, and is fixed to the latter by arms 171 and 172 fixed to the chains. In this arrangement, the chain 160 is driven continously about its triangular path by the drive means 161, which causes the arms of the units 131, 132 and 133 to rotate about the axes of their respective sprockets 155, 157, and 139. This imparts planetary motion to the sprockets 151, 156 and 158, the latter rotating axially while swinging about eccentric axes. This motion imparts an oscillation to the chains 164 and 165 while the latter move about their endless paths. More specifically, the chain 160 moves in the direction of arrow 175, see FIGURE 8, about a fixed endless path determined by the fixed centers of sprocket wheels 155, 157 and 139. Chains 164 and 165 move along an endless path about the centers of sprocket wheels 156, 158 and 151; and further, the sprocket wheels 156, 158 and 151 rotate in unison about the centers of sprocket wheels 155, 157 and 139, respectively. Hence, the endless path of chains 164 and 165, and the chains themselves are moved about the centers of sprocket wheels 155, 157 and 139 in the direction of arrows 176, 177 and 178. This rotary motion of chains 164 and 165 about the centers of sprocket wheels 155, 157 and 139 is of a speed relative to the linear velocity of the chain such that a point on the chain describes a sinusoidal configuration. Of course, these relative velocities may be changed to provide a desired configuration to be described by a point on the chains 164, 165. It will thus be appreciated that a point on the chains 164, 165, or an object carried by the chains, such as the testing head 170 traverses a generally triangular path having wavy sides, as may be seen in FIGURE 17 and will be described more fully hereinafter.

Figure 7:
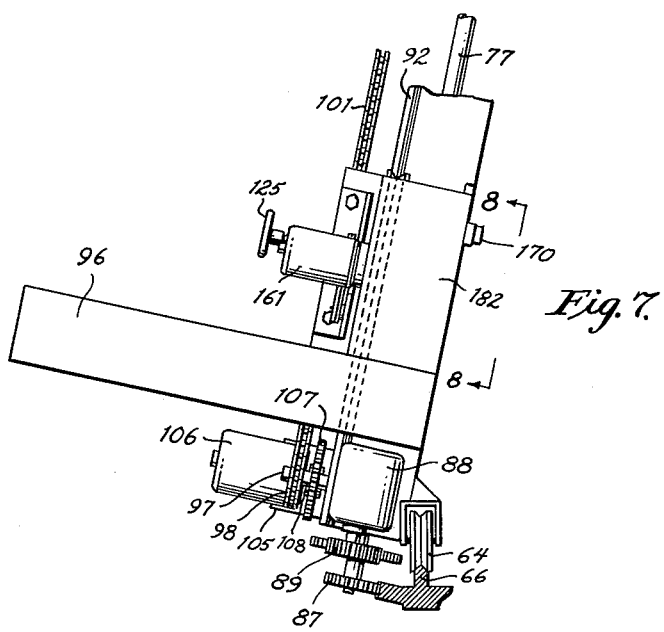
FIGURE 7 is a side elevational view taken from the right-hand side of FIGURE 6.

As best seen in FIGURES 6 and 7, limit switches 180 and 181 are carried by the mounting member 113, as on the upper region thereof, the limit switch 180 being on the left side of the pattern-making mechanism 130 and serving to limit upward movement of the subcarriage 93, while the limit switch 181 is located on the right side of the patternmaking mechanism and limits horizontal rightward movement of the subcarriage. In FIGURE 7, the patternmaking mechanism 130 is concealed by a wall 182 extending rearward from the right edge of the mounting plate 113. A switch 193 limiting downward movement of the subcarriage 93 may be fixed on a lower region of the housing 61; and, an additional limit switch 184 on the leftward end of the track 65 is located to limit leftward horizontal movement of the main carriage 60.

In addition to the testing head 170 carried by the patternmaking mechanism 130 of the mounting member 113, an additional testing head 185 is carried by the mounting member for movement therewith. That is, the testing head 185 is relatively immovably secured to the mounting member 113, provision of course being made for necessary compensatory motion and adjustment. In practice, it is preferred that the testing heads 170 and 185 are both of the sonic type, such as employ crystals producing sonic vibrations. As is well known, sonic testing apparatus may be of the transmission type, for transmission through an article being tested and reception on the other side thereof, or by transmission into the article being tested and reflection therefrom. In the instant embodiment, for purposes of illustration and without limiting intent, the testing heads 170 and 185 may be considered as of the reflective type. In the instant embodiment, the testing head 170 may serve to detect internal flaws or defects in the work 51, and may move in the manner described hereinbefore to test the work along a predetermined-line pattern. That is, the subcarriage 93 remains motionless while the testing head 170 traverses its wavy-sided triangular configuration for testing along the line of such configuration. While the subcarriage 93 remains motionless and the mechanism 130 generates its pattern, the testing head 185 may test a single spot on the work 51, say for thickness of the work.

The testing head 170 is shown in greater detail in FIGURE 10 as including a generally cylindrical outer shell 187 having its forward end closed by a wall 188 and its rearward end open facing toward the work 51 and provided with an internal annular flange 189. A generally cylindrical sleeve 190 is located in spaced relation concentrically within the cylindrical shell 187, being substantially longitudinally coextensive therewith, having its front end closed by a wall 191 adjacent to the wall 188 of the outer shell, and having its rear end open. Suitable journal means, such as antifriction bearings 192, mount the sleeve 190 for axial rotation within the shell 187. The unit 170 is mounted on the chains 164 and 165 by the standoff arms 171 and 172 which are fixed to the shell 187.

Slidably received interiorly within the sleeve 190 is a generally cylindrical cup 195, which is adapted to project rearward beyond the sleeve and face rearward toward the article 51. The forward or inner end of the cup 195 may be provided with a central opening 196 to leave an inner annular wall 197. Resilient means, such as a coil compression spring 198, is interposed between the sleeve end wall 191 and cup end wall 197 to urge the cup rearward toward the article 51. Adjustable stop means may be provided, such as a threaded stud 199 extending rearward from the sleeve end wall 191 spacedly through an aperture in the cup end wall 197 where it is provided with a stop nut 200.

A sound-wave-producing crystal 203 is arranged within the cup-shaped container 195 and is carried by a cup-shaped casing 204 having an external rim of flange 205. The casing 204 is arranged on the inner side of the crystal 203 so that the latter faces outward through the open end of the cup 195. Further, adjustable means may be provided for mounting the crystal 203 in the cup 195, as by a threaded member or screw 206 extending in threaded engagement through the flange 205 and having one end pivotally mounted in the inner wall 197 of the cup 195, as by a collar 207. The outer end of screw 206 may be provided with a wrench socket 208 accessible through the open rearward end of the cup 195 for turning the screw and thereby adjusting the crystal position toward and away from the open end of the cup, for changing the dimension of the couplant column.

On the rearward open end of the cup 195 may be provided a removably secured annular member or wear ring 209 for engagement with the article 51. The wear ring 209 may be secured by threaded engagement, as shown, or other suitable means. The electrical wiring necessary to operation of crystal 203 is shown at 210 and extends from the crystal through a wall portion of the cup 195 exteriorly of the sleeve 190. Also, a fluid conduit 211 is connected to the cup 195 exteriorly of the sleeve 190 for communicating couplant fluid to the interior of the cup.

In operation, the crystal 203 is electrically energized, and couplant fluid is passed through the conduit 211 to the interior of cup 195, where it may fill both the latter cup and the sleeve 190, it being essential that the space between the crystal 203 and the article be fully occupied by the couplant. Thus, the couplant fluid serves to acoustically couple the crystal 203 to the article 51, and additional fluid may be continuously supplied through the conduit 211 to replace couplant fluid lost between the wear ring 209 and article 51.

The fluid conduit 211, see FIGURE 9, and electrical wiring 210 may be connected to their respective sources through a coaxial swivel connection 212. The swivel connection 212 may include a tubular conduit 213 passing through the mounting member or plate 113 and having on its rear end a rotary head or cap 214. The fluid conduit 211 is connected to the rotary cap 214 for fluid communication therethrough with the interior of the tubular member 213, and rotation with the cap, as required. Extending coaxially through the tube 213 and rearward through and beyond the head 214 is a conduit 215 receiving and conducting the electrical wiring 210. The conduit 215 may rotate with the head 214, as required by motion of the testing head 170. While the sleeve 190 and its contained cup 195 of the testing head 170 are shown as axially journaled by bearings 192, which construction may be preferred, this journaling structure is not entirely necessary when the electrical and fluid lines 210 and 211 are connected to a swivel connection, as at 212.

In FIGURES 11–14 are shown modifications of the testing head 170 adapted to be substituted therefor. The testing head, generally designated 220, of FIGURE 11 includes a generally cylindrical cup 221 having its front end closed by a wall 222. A mounting member 223, arranged forward of the cup 221, may be secured to the chains 164 and 165 by any suitable means (not shown); and, a plurality of threaded studs 224 project forward from the forward cup end 222 slidably through the mounting member 223 where they are provided on their threaded forward ends with stop nuts 225. Coil compression springs 226 are circumposed about the studs or pins 224 and each interposed between the support member 223 and end wall 222 of the cup 221 to urge the latter rearward toward an article or plate 51. Thus, the cup 221, having its rear end open, is biased rearward into engagement with the plate 51 during operation.

Interiorly within the cup 221 is a transducer unit or crystal 227 facing rearward toward and spaced forward from and within the open rear end of the cup. The terms "transducer," "crystal" and "transducer unit" are used interchangeably as designating either the transducer per se or together with its support. The crystal 227 is thus located in adjacent, spaced, facing relation with respect to the article or plate 51 being tested. Suitable means may be provided for mounting the crystal 227 in the cup-shaped casing 221, such as one or more threaded pins or studs 228 extending forward from the crystal 227 through and beyond the closed front-end wall 222 of the cup, where each of said studs is provided with a nut 229. Spring means 230 may be engaged about the stud or pin 228 interiorly of the cupped casing 221, and interposed between the front casing wall 222 and the crystal 227 to urge the latter rearward and maintain the nut 229 in abutting engagement with the wall 222. By this or other suitable construction, the crystal 227 may be mounted in the cupped casing 221 for adjustment toward and away from the rear open end of the casing.

Suitable electrical connections are provided for the crystal 227, and omitted from the drawing for clarity of illustration. A fluid conduit 231 is connected to the cup-shaped casing 221 for conducting couplant fluid into the casing. By this means, the casing is, at all times, kept full of couplant fluid, such as oil or water, to acoustically couple the crystal 227 with the plate or article 51 being tested. Thus, should couplant fluid leak from the cupped casing 221, as between the rear open end thereof and the article 51, it is replenished through the conduit 223; and of course, couplant fluid at the engaging surfaces of the open rear casing end and article 51 serves as lubricant to facilitate movement of the casing 221 along the article or plate 51.

Figure 12:
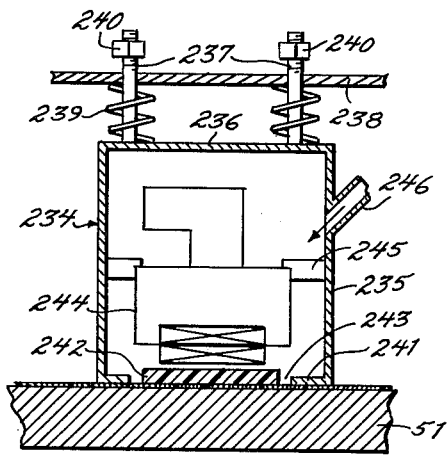

A further embodiment of testing head is shown in FIGURE 12, wherein a generally cylindrical casing 235 has its front end closed by a wall 236 which is provided with a plurality of forwardly projecting mounting studs or pins 237 passing slidably through a mounting member or plate 238 adapted to be carried by chains, such as 164 and 165 in FIGURE 9. Circumposed about the studs 237 and engaged between the mounting member 238 and casing wall 236 are coil compression springs 239 resiliently biasing the casing rearward toward the article or plate 51 being tested, while stop members or nuts 240 may be threaded or otherwise adjustably carried on the forward ends of pins 237 to limit rearward movement of the casing 235.

The rearward end of casing 235 is provided with an annular, inturned flange 241; and, a generally flat disc or face piece 242, of plastic or similar material is mounted in the rear-end opening of the casing. The rear-end flange 241 and face piece 242 may be configured to provide rear-end openings 243, for a purpose appearing presently.

A crystal or transducer unit 244 is arranged in the casing 235, being mounted therein by any suitable means, such as brackets 245, and arranged in adjacent, spaced facing relation with the inner or forward side of the face piece 242. By this construction, the distance or spacing between the face piece 242 and crystal 244 may be constant. A fluid conduit 246 is connected to the casing 235 for conducting couplant fluid to the interior of the casing. The couplant fluid, such as oil or water, completely fills the interior of the casing, including the space between the face piece 242 and crystal 244, and may pass into the rear-end openings 243 of the casing to the article or plate 51 for lubricating engagement between the latter and the casing.

Figure 13:
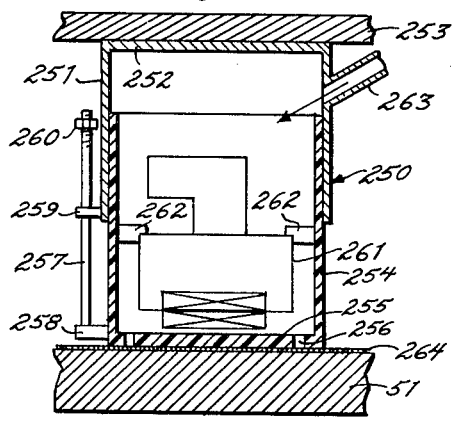

Another embodiment of testing head adapted to be substituted for the testing head 170 is generally designated 250 in FIGURE 13. The testing head 250 includes a generally cylindrical external sleeve 251 having its forward end closed by a wall 252 and secured to a mounting member 253 which is adapted to be carried by the chains 164 and 165. The rearward end of the sleeve 251 is open and slidably receives a generally cylindrical cup 254. The cup 254 may be fabricated of plastic, having its forward end open for communication with the interior of sleeve 251, and having its rear end closed by a plastic end wall 255 provided with through apertures 256. Thus, the inner cup 254 is slidable in the outer sleeve 251. To prevent withdrawal of the inner cup 254 from the outer sleeve 251, and permit substantial telescopic motion, suitable stop means may be provided, such as one or more elongate rods 257 connected by a bracket 258 to the rearward region of cup 254 exteriorly thereof and extending forward slidably through a bracket 259 carried exteriorly by the sleeve 251. An adjustable limiting element or nut 260 may be threadedly engaged on the forward end of rod 257 for limiting abutment with the bracket 259.

A transducer unit or crystal 261 is mounted in the cup 254 by any suitable means, such as brackets 262, the crystal being located and arranged in adjacent, facing spaced relation with the plastic rear-end wall 255 of the cup.

The outer element or sleeve 251 may be provided with an inlet conduit 263 for passing couplant fluid, such as oil, interiorly of the cup 254 and sleeve 251 to completely fill the interior region thereof, including the space between the crystal 262 and rear-end wall 255. The pressure of couplant fluid entering through conduit 263 serves to urge the cup 254 rearward into engagement with the article or plate 51 being tested. Also, the couplant fluid is enabled to pass through the apertures 256 of the rear cup wall 255 to the adjacent surface of plate 51 for lubricating the latter to facilitate movement of the testing head 250 relative to the article 51. This may provide, in operation, a lubricating film 264 of couplant fluid on the article 51. It will thus be appreciated in this embodiment, that the couplant fluid, in addition to its lubricating and acoustic coupling functions, serves to urge and maintain the cup 254 in proper physical relation with respect to the article 51.

Figure 14:
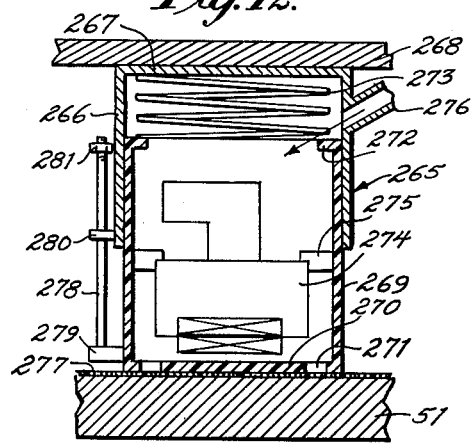

A further embodiment of testing head, generally designated 265 is shown in FIGURE 14 and includes a generally cylindrical outer element or sleeve 266 having its forward end closed by a wall 267 and secured at its forward end to a mounting member 268, which may be carried by the chains 164 and 165. A generally cylindrical, preferably plastic inner cup 269 has its forward end telescopically engaged in the rear open end of the sleeve 266. The cup 269 has its rear end closed by an integral plastic wall 270 which is provided with through apertures 271, while the forward end of the cup 269 is substantially completely open except for an inturned annular flange 272. A coil compression spring 273 is interposed in the forward interior region of the sleeve 266, in engagement between the front-end wall 267 and the annular flange 272 to urge the cup 269 rearward toward the article or plate 51 being tested.

A transducer unit or crystal 274 is mounted in the cup 269, by any suitable means such as brackets 275, and is arranged in adjacent, facing spaced relation with the inner or forward side of the rear-end wall 270. Connected in fluid communication with the interior of the outer sleeve 266 is an inlet conduit 276 for couplant fluid to enter into the communicating interior regions of sleeve 266 and cup 169, substantially completely filling said interior regions, including the space between crystal 274 and wall 270, and wall apertures 271. In this embodiment, the couplant fluid serves its acoustic couplant function, but does not appreciably urge the cup 269 rearward as the holes 271 relieve the fluid pressure. The cup 269 is urged rearward by the spring 273. Further, the couplant fluid is effective to provide a lubricating film 277 in the same manner as in the embodiments of FIGURES 12 and 13. To limit rearward extension of the cup 269 from the sleeve 266, a rod 278 may be fixed exteriorly to the cup by a bracket 279 and extend forward therefrom slidably through a bracket 280 carried exteriorly by the sleeve 266. A stop member or nut 281 may be threaded or otherwise adjustably carried on the forward end of rod 287 for abutting engagement with the bracket 280 to limit telescopic extension of the cup 269 relative to the sleeve 266.

Figure 15:
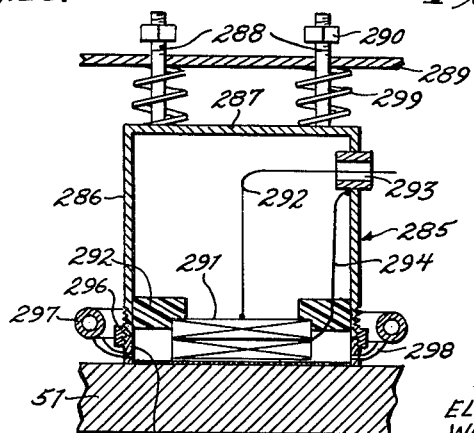

In FIGURE 15 is shown a testing head of the sound-wave-producing type, which may be employed for spot testing, as at 185, or line testing, as at 170. The testing head 285 of FIGURE 15 includes a generally cylindrical cup or casing 286 having its front end closed by a wall 287 which is provided with forwardly projecting studs or pins 288 passing slidably through a mounting member 289. Coil spring 299 may be circumposed about the studs 288 and interposed between the front casing wall 287 and mounting member 289 to urge the casing 286 rearward toward an article or plate 51 being tested. Stop members or nuts 290 may be threadedly engaged on the forward ends of studs 288 to limit forward movement of the casing 286 by engagement with the mounting member 289.

A sound-wave-producing crystal or transducer unit 291 is arranged in the forward region of casing 286, and may be fixedly secured therein by a generally annular mounting member or bracket 292, which combines with the crystal to close or extend completely across the casing 286. An electrical supply conductor 292a is shown passing through an opening 293 in the casing 286, forward of the crystal and bracket 292, and a ground lead 294 is connected between the crystal and the casing.

Extending rearward from and in alignment with the casing 286 is an annular wear member or ring 295, which is detachably secured to the casing 286 by an annular collar 296 extending externally about and threadedly secured to both the casing and wear member. The rearward end or end edge of the wear member 295 is thus resiliently biased by the force of springs 290 into engagement with the article or plate 51.

An annular conduit or manifold 297 is circumposed in spaced relation about the rearward region of the casing 286 and connected by a plurality of branch conduits 298 to the interior of the wear member 295. Thus, the manifold 297, which is connected to a source of couplant fluid, is physically connected to the wear member 295 by the branch conduits 298, and also connected by the latter for fluid communication with the interior of the wear ring. Of course, other suitable physical- and fluid-connection means may be provided, if desired.

In operation, couplant fluid passes to the interior of the wear ring 295, to substantially completely occupy the space forward of the crystal 291 and its mounting bracket 292 to provide acoustic coupling between the crystal and the piece 51. Further, the couplant fluid may also serve to lubricate the engaged surface of the plate 51 to minimize wear of the ring 295. However, when the annular member or ring 295 wears beyond permissible limits, it may be quickly and easily removed and replaced by mere screwing of the collar 296 to release the wear member from connection to the casing.

In the testing procedure, the plate 51 is positioned on the stand 50 as shown in FIGURES 1–3, by a crane or other suitable handling apparatus. With the main carriage, working vehicle or trolley 60 located at the far left and subcarriage 93 at a lower region on the main carriage, as shown in FIGURE 1, the testing operation may proceed. With the subcarriage 93 stationary, the spot tester or "Vidigage" is actuated to obtain a thickness indication, and the motor 161 energized to operate the pattern-making mechanism. Specifically, the motor 161 through the chain 160 causes simultaneous rotation of the triangularly arranged rotary units 131, 132 and 133 and simultaneous motion of the endless chains 164 and 165 both about a triangular path and in an oscillatory or weaving motion along the triangular path. The testing head 170 is carried by the chains 164, 165 about the weaving or undulate triangular path and is energized to locate defects in the plate along the line or path of movement. In practice, the sinuous weaving path may have an amplitude of about 1½ inches, and a pitch of about six to nine inches.

Upon completion of a single triangle, wherein the line-testing head or "Reflectoscope" makes one complete cycle about the triangular path, a rotary limit switch 300, associated with the motor 161, see FIGURES 1 and 9, deactuates the motor to stop operation of the pattern-making mechanism 130.

Figure 16:
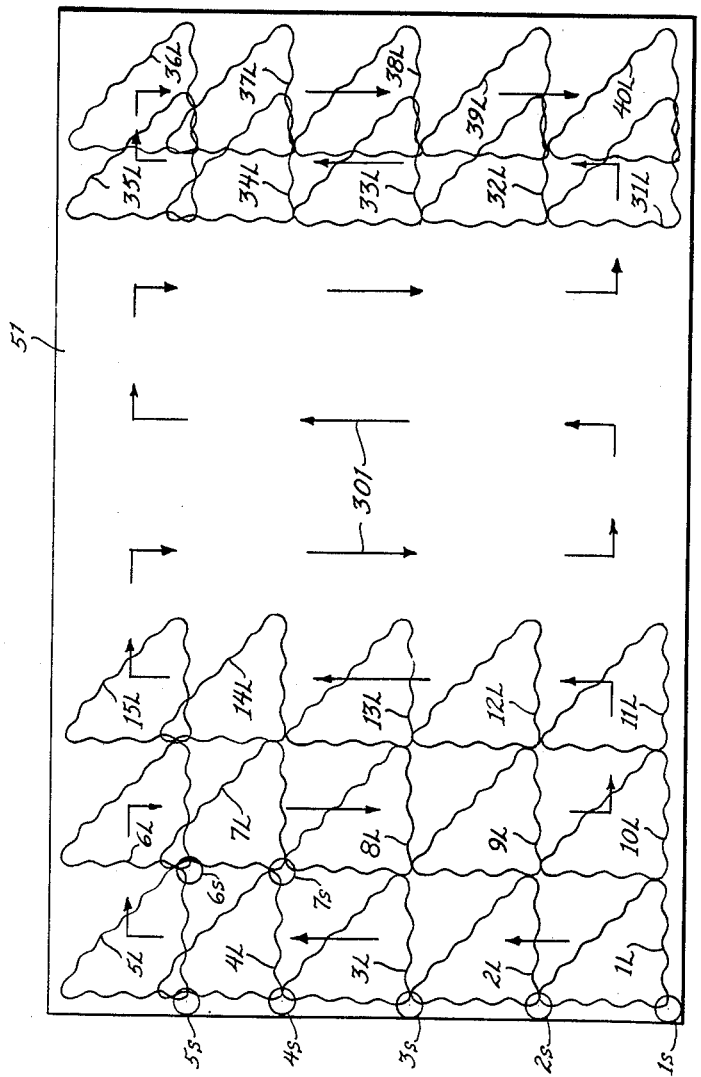
FIGURE 16 is a diagrammatic presentation showing a pattern of testing adapted to be produced by the instant apparatus.

Referring now to FIGURE 16, wherein is schematically illustrated the plate-testing pattern, the preceding paragraph may be considered as describing formation of the lower-left triangle, designated 1L, and the spot test 1s. The subcarriage 93 then moves vertically upward by actuation of the motor 106 to drive the chain 101 and cause vertical movement of the subcarriage a distance equal to the vertical dimension of the triangular path defined by the patternmaking mechanism. In practice, the length of steps of vertical subcarriage movement, and hence the vertical extent of the triangular pattern, is approximately two feet. The motor 106 then stops, the patternmaking mechanism 130 is actuated by the motor 161 and the test units 185 and 170 are operated to obtain indications of thickness and defects. This operation describes triangle 2L and spot 2s of FIGURE 16.

The same procedure is repeated to describe vertically succeeding triangles 3L and 4L at spots 3s and 4s.

After the formation of triangle 4L, the subcarriage 93 is moved vertically upward to a limiting position sensed by the top-vertical-limit switch 180, see FIGURE 6, which deactuates the motor 106 to locate the patternmaking mechanism 130 in position to define a triangular pattern 5L proximate to the upper edge of plate 51 and having its lower region overlapping the upper region of next-lowermost triangle 4L.

After the formation of uppermost triangle 5L, the main carriage or trolley 60 is caused to move rightward by actuation of motor 88 through gears 89 and 90, and by engagement of gear 87 with fixed toothed rack 67. The subcarriage 93, of course, moves horizontally with the main carriage 60, and the length of the horizontal motion or step is approximately equal to the horizontal dimension of the triangular patterns. In practice, the triangular pattern may be a right triangle having equal sides of about two feet. After the two-foot rightward step by movement of the main carriage 60, the pattern mechanism 130 and the test units 185 and 170 are actuated to describe the triangular pattern 6L and spot 6s in horizontal alignment with and proximate to the triangular pattern 5L and its spot 5s. At the cessation of making the triangular pattern 6L, the motor 106 is energized in the reverse direction to lower the subcarriage 93. However, the subcarriage 93 is not at this time lowered a full vertical step, but a step equal to that of the last upward vertical step. The pattern-generating mechanism 130 and test heads 185 and 170 are then actuated to describe the triangular pattern 7L and spot 7s in side-by-side, horizontal alignment with the triangular pattern or path 4L at its spot 4s. Thus, the upper region of triangular path 7L overlaps the lower region of triangular path 6L.

In the same manner, the subcariage 93 and its patternmaking mechanism 130 are moved vertical steps to describe a vertical row of triangular patterns, and are moved horizontal steps at the lower and upper ends of the vertical rows along the path of the arrows 301.

At a lowermost position of the subcarriage 93, say in formation of the triangular poth 10L, further downward movement of the subcarriage is prevented by engagement of the subcarriage with the bottom-vertical-limit switch 183 on the column 92 of main carriage 93, see FIGURE 6. Further, the horizontal-right-limit switch 181 senses the right-hand edge of plate 51 to limit the final horizontal step of the subcarriage 93 just prior to formation of the upper-rightmost triangular path 36L. Thus, the upper-rightmost triangular path 36L is located with its leftward region overlapping the rightward region of the next-adjacent horizontal triangular path 35L, and similarly the vertically succeeeding triangular patterns 37L, 38L, 39L and 40L respectively overlap the next-adjacent horizontally leftward triangular patterns 34L, 33L, 32L and 31L. This is in addition to the overlap of the uppermost triangular pattern of each vertical row with respect to its next-adjacent lower triangular pattern. Of course, it is conceivable that a plate may be of just the proper dimensions to eliminate any substantial overlap of pattern formations. Also, we realize that a suitable computer may be employed to make a partial triangle or pattern, rather than the overlapping triangles or patterns. We also realize that adjustable mounting means may be provided for the shafts 134, see FIGURE 9, to shift the centers of sprockets 139, 153 and 157, for changing or adjusting the configuration and dimensions of the pattern of FIGURE 16. Of course, compensation may be made in the length of chain 160 and chains 164 and 165, see FIGURE 8, and adjustment may be made of the vertical step at 438, horizontal step at 353, triangle travel at 501, and the location of the limit switches 180 and 181 with respect to the mechanism 130. The test pattern shown in FIGURE 16 of the grid configuration and diagonal lines is prescribed by Mil Spec S16216E, as a somewhat arbitrary configuration producing satisfactory results. The wavy-line configuration or weave is also required in certain specifications for plate testing.

In the diagrammatic representation of FIGURE 17, showing the controls, the subcarriage 93 is shown as vertically reciprocable by the arrow 336. The top-vertical-limit switch 180 is shown carried by the subcarriage 93; and, the horizontal-right-limit switch 181 is shown toward the right for simplicity of illustration. The bottom-vertical-limit switch 183 is shown carried by the column, main carriage or trolley 60. Schematically, horizontal-motion mechanism for the main carriage or trolley is illustrated as a toother rack 67 and a horizontal-drive pinion 87. The drive motor 88 is connected in driving relation with the pinion 87 to effect horizontal movement of the main carriage or trolley 60. Vertical up-and-down movement of the subcarriage 93 is effected by the actuation of the reversible vertical-drive motor 106 and lower vertical-drive sprocket 98.

The supply conductors or lines for both the horizontal-drive motor 88 and the vertical-drive motor 106 are designated $L_1$ and $L_2$. Included in the movable top-limit switch 180 carried by the subcarriage 93 is a normally closed switch 337 and a normally open switch 338. A fixed switch assembly or lower-limit switch 183 is located in the path of movement of the subcarriage 93 to be engaged by the latter at the lower end of its vertical movement to actuate the lower-limit-switch assembly. Included in the lower-limit-switch assembly 183 is a normally closed switch 341, and a normally open switch 342. The switches 341 and 342 are adapted to be respectively opened and closed upon downward engagement of the lower-limit switch 183. The upper-limit switch 180 may be of the sensing-finger type for sensing the upper edge of a plate, while the lower-limit switch 183 may be of the button type to be engaged by an undersurface of the subcarriage 93. Of course, the limit switches may be of other suitable types, such as magnetic, proximity, photoelectric or otherwise.

Upon sensing of the upper plate edge by the top-limit switch 180, the switches 337 and 338 are respectively oped and closed. The right-horizontal-limit switch 181 may also be of the finger-sensing type or other suitable construction, and includes a normally closed interlock switch 416, a normally open down-starter switch 417, and a normally open up-starter switch 418. The right-horizontal-limit switch 181 senses the right-hand edge of a plate 51 upon horizontal movement of the main carriage 60 to respectively open the contacts of switch 416, and close the contacts of switches 417 and 418.

Operatively connected to the horizontal variable-speed drive motor 88, for rotation therewith and in predetermined relation thereto, are a pair of cams 343 and 344. In the illustrated embodiment, the cams 343, 344 are connected to the shaft of drive pinion 87 through a variable-speed drive 353 and a synchronizing clutch 500, and the cams are arranged in 180-degree out-of-phase relation with each other. The ratio of drive 353 is adjusted so that the horizontal steps are equal to the base of the triangle pattern. Further, the cams 343 and 344, as illustrated, are substantially identical, each being configured to define a dwell of slightly less than 360 degrees, and a recess in the remaining region, as at 345 in cam 343 and at 346 in cam 344. The recesses of the respective cams are located in 180-degree out-of-phase relationship. Associated with each of the cams 343 and 344 is a bar or contact blade adapted to ride on the respective cam, a contact bar or blade 347 pivoted at 348 and having a transversely projecting cam follower 349 adapted to ride on the dwell of cam 343 and engage in its recess 345. This defines a switch to stop and start horizontal movement at the bottom of vertical motion, as well as the up-start return. In the illustrated condition, the follower 349 is riding on the dwell of cam 343, and thus in an elevated, open condition, as will appear presently. Also, a contact bar 350 is associated with the cam 344 and pivoted at 351, including a transversely projecting cam follower 352 adapted to ride on the dwell of the cam and engage in its recess 346, the contact bar 350 being swung downward and having its follower 352 engaged in the recess 346, in the illustrated condition.

Operatively connected in driven relation to the variable-speed vertical-drive motor 106, through reducer gears 107 and 107, to the sprocket 98, and through the reducer 438 are the cams 439 and 440. The reducer gears 438 may be a fixed ratio such that the vertical steps are equal to the height of the triangle pattern. The cam 439 includes a dwell of slightly less than 360 degrees and a radially protruding lobe on the remainder of its periphery, while the cam 440 is formed with a dwell of slightly less than 360 degrees and a recess occupying the remainder of its periphery. A contact bar or blade 502 is pivoted at 503 and rides on the cam 439, being illustrated at the position just commencing to rise on the lobe of the latter cam. This provides momentary start for the pattern-forming mechanism, as will more fully hereinafter be described. A contact bar or blade 504 is pivoted at 505 and follows the cam 440, having a transversely projecting follower portion 506 illustrated as engaged in the recess of cam 440, which condition serves to stop vertical motion.

Asociated with and driven by the triangle-drive motor 161 through suitable variable-speed-reducer means 420 to sprocket 163, through fixed-ratio-reducer means 501 are cams 419, 300a, and 423. The fixed-ratio-reducer means 501 is such that one complete triangular pattern is made during one revolution of the cams 419, 300a and 423. The cam 419 constitutes part of a normally closed horizontal interlock, as will appear presently, and is formed with a slightly less than 360-degree dwell, the remaining degrees being recessed. A contact arm or blade 508 is pivoted at 509 and includes a transversely projecting follower 510 adapted to ride on the dwell of and engage in the recess of interlock cam 419.

The cam 300a constitutes part of the start switch 300 for the vertical drive, including a dwell of slightly less than 360 degrees and a radial protuberance or lobe 300b, and shown in closed condition. A pivoted contact blade or arm 300c rides on the cam 300a, being raised by the lobe 300b in the illustrated condition.

The cam 423 is similar to the cam 419, including a dwell of slightly less than 360 degrees with the remainder being recessed, but is slightly angularly offset from the latter cam. The cam 423 constitutes part of a normally open stop switch for the triangle mechanism and includes a pivoted follower arm or contact blade 511 having a transverse protuberance 512 adapted to follow the cam and engage in the recess thereof. The stop switch or blade 511 is shown about to open.

Following the circuitry, it will be observed that supply line $L_2$ is connected to a pair of branch lines 354 and 355, the former being connected through a normally closed up-stop switch 362 to the normally closed switch 337 of switch assembly 180, and the latter of the branch lines being connected through a normally closed down-stop switch 363 to the normally closed switch 341 of the switch assembly 183. From the other side of the switch 337 extends a conductor 356 which connects through a normally closed interlock switch 451 and line 452 with one side of an up-memory and top starter for the vertical-drive motor 106. The up-memory and starter 357 is connected by a conductor 358 through a normally open, hold-down or self-holding relay contact 359 to a conductor 371. Connected in parallel with the hold-down contacts 359, as by a conductor 360, is a manual-start switch 361.

The other branch-line conductor 355 from the supply line $L_2$ is connected through the normally closed switch 341, a conductor 364, a normally closed switch 449, and conductor 515 to one side of a down-memory and starter 365 of the vertical-drive motor 106. The down-memory and starter is connected through a conductor 366, which includes normally open, self-holding or hold-down contacts 367, to a conductor 376. A manually operable switch 368 is connected by a conductor 369 in parallel with the hold-down relay 367.

From its point of connection to the lines 354 and 355, the line $L_2$ extends by conductor 516 to a pair of parallel switches 447 and 448, respectively mechanically connected to the holddown contacts 367 and 359, thence through conductor 517, to conductor 445 and contact 518 for momentary electrical connection with follower-contact bar 502 upon rotation of cam 439. The contact bar 502 is connected through conductors 519 and 520 to the normally open contacts 521 and 522 of a vertical-step relay 435, which contacts are further connected through a conductor 437 to one terminal of the vertical-drive motor 106.

The supply line $L_1$ is connected through a pair of parallel conductors 370u and 370d, which conductors respectively include power switches 382u and 382d, to additional respective terminals of the vertical-drive motor 106. The vertical-drive motor may be placed across one supply line $L_1$ through either the up-memory and starter or down-memory and starter to effect up or down movement of the subcarriage; and, safety interlocks 383, 384 and 385 are provided between the contacts 359, 448, 449, 382u, 382d, 451, 447, 367, and the up- and down-starters to insure proper actuation thereof.

Associated with the contact blade 504 of cam 440 is a contact 442, which is connected by a conductor 524 including a push-button switch 443 to the pivot 505 of the contact blade. From the pivot 505 the contact blade 504 is connected by a conductor 525 to $L_1$. The contact 442 is connected by a conductor 444 with a contact 526. A latching relay includes a contact 527 engageable with the contact 526, a first set coil 232 and second release coil 231 connected by a conductor 528 to operate the movable contact 527. A conductor 434 extends from the movable relay contact 527 to one coil side of the vertical-step relay 435, and the other coil side of the vertical-step relay is connected by a conductor 529 to conductor 519.

Extending from the line or conductor 358, between the up starter 357 and the hold-down contacts 359 is a conductor 372 which terminates at a contact 373 located to make and break electrical connection with the contact blade or bar 347 when the follower 349 thereof is in the cam recess 345 or on the dwell of the cam respectively. Similarly, a conductor 374 is connected to the conductor 366 between the down starter 365 and the hold-down-relay contacts 367 and extends therefrom terminating in a contact 375 adapted to make and break electrical connection with the pivoted contact bar 350 on respective engagement of the follower 352 in the recess 346 and follower engagement with the dwell of the cam. The contact 373 thus combines with the bar or blade 347 to define a switch operated by the cam 343, while the contact 375 and bar or blade 350 combine to define a switch operated by the cam 344.

From the line $L_1$ extend a pair of branch conductor 377 and 378, the former being connected to one side of the normally open switch 338, and the latter being connected to one side of the normally open switch 342. From the other side of the switch 338 extends a conductor 379 which connects to the pivot 351 and blade or bar 350. A conductor 380 extends from the other side of the normally open switch 342 to the pivot 348 and bar or blade 347. A pair of contacts 387 and 388 are respectively associated with the contact bars 347 and 350 to be electrically engaged thereby upon elevation of the bars to their dwell condition out of the respective cam recesses. The contacts 387 and 388 are connected in parallel by conductors 389 and 390 to a conductor 391 which is connected to a horizontal-forward starter 392 associated with the horizontal-drive motor 88.

The power line $L_1$ is connected by conductor 393 through a power switch 394 to the forward side of the horizontal-drive motor 88; and, the other supply line $L_2$ is connected through conductor 398 to the common terminal of the reversible horizontal-drive motor.

Connected to one side of the horizontal-forward starter 392 is a conductor 530 provided with a push-button switch 413. On the other side of the switch 413 is a conductor 531, which is connected through a conductor 532 to the pivot 509 and contact bar or blade 508. The conductor 531 is also connected to a conductor 533 which is connected to one side of the normally closed stop switch 416. The other side of the normally closed switch 416 is connected by a conductor 534 through a push-button stop switch 400 to the horizontal-motor supply line 398. A conductor 412 extends from the conductor 530 of the forward-horizontal starter 392 to a contact 411 located for engagement with the bar or blade 508 when its follower portion 510 is fully received in the recess of cam 419. Also conductor 530 connects normally open push-button switch 413 with conductor 398 through normally closed switches 416 and 400.

Joined to the conductor 391 for connection to the other side of the forward-horizontal starter is a conductor 535 which is provided with a push-button switch 414, which is coupled to switch 413, and connected by a conductor 536 to line $L_1$ at conductor 393. As noted hereinbefore, in addition to the normally closed contacts 416 for stopping horizontal travel at the right-hand limit, the right-horizontal-limit switch 181 includes normally open contacts 417 and 418. One side of the normally open contacts 417 (for down starting at the right limit) is connected by a conductor 537 to conductor 374, and the other side of the normally open contacts is connected by a conductor 538 to the conductor 379. One side of the normally open contacts 418 (for up starting at the right limit) is connected by a conductor 539 to the conductor 372, and the other side of the contacts 418 is connected by a conductor 540 to the conductor 380.

The power switch 394 is operatively connected to the forward-horizontal starter, as indicated at 401. Associated with the switch 394 is a normally closed interlock switch or contact 407 shown in its closed condition, which keeps the triangle mechanism from running during horizontal motion. The reverse-horizontal starter 402 connects line $L_1$ by a conductor 541 to conductor 393 ahead of the power switch 394, and includes normally open switch means or contacts 409 which are connected on one side to the conductor 541 and on the other side through a conductor 408 to a reverse-actuating terminal of the horizontal-drive motor 88. Also associated with the reverse-horizontal starter and mechanically interlocked with the normally open contacts 409 is switch means or contacts 410. The contacts 410 are connected on one side through a conductor 542 to the other coil side of the reverse-horizontal starter. Connected to the other side of the normally open hold-down contacts 410 is a conductor 543 which includes a normally closed stop switch 404 and extends through a normally closed left-end-horizontal-limit switch 405 to connection with the conductor 398. Connected between the conductor 542 and the conductor 543 and one coil connection of reverse-horizontal starter 402 is a normally open manual-reverse switch 403.

A starter for the triangle-drive motor 161 is designated 427 and is connected by a conductor 406 through the normally closed contacts 407 to the supply line 393. On the other side, the triangle-drive starter 427 is connected by a conductor 544 through a manual-triangle-stop switch 426 to the juncture of contact arm 511 and conductor 445. The arm or bar 511 is engageable with a contact 424 which is connected by a conductor 545 to the conductor 398, and thence to the release coil 431 of the latching relay 431, 432. The contact 424 is further connected by a conductor 546 having a manual-triangle-start switch 425 to the conductor 544. The other side of the latching relay release coil 431 is connected by a conductor 430 to a contact 547 of the cam-follower-contact bar 303. The contact 547 is further connected by a conductor 548 to the juncture of conductor 444 and conductor 433. The cam-follower-contact bar 300c is connected by a conductor 549 to the conductor 393. As noted hereinbefore, the set coil 432 of the latching relay 431, 432 is connected on one side to the release coil 431, and further, the set coil is connected on its other side by a conductor 433 to the contact 388.

Returning again to the triangle drive, the triangle-drive motor 161 is connected on one side by a conductor 550 to $L_2$, and is connected on its other side through a conductor 429 and normally open relay contacts 428 of the triangle-drive starter 427, and conductor 551 to supply line $L_1$.

In the conductor 519 connected to supply line $L_2$ is a manual-vertical-stop switch 453.

In describing operation of the controls of FIGURE 17, the condition shown therein may be assumed to be that wherein the triangle-pattern mechanism has just completed triangle 6L of FIGURE 16 and the subcarriage 93 is just ready to move one step downward into position to make the next lower triangular pattern 7L. In this condition, the sensing finger of switch 180 is just over the upper edge of plate 51 and is located relative to the triangle-forming mechanism such that a triangle can be defined with its uppermost region proximate to the upper edge of the plate.

When the sensing finger of limit switch 180 rode over the upper plate edge, the contacts 337 were opened which caused the up-memory and top starter 357 to drop out and momentarily close contacts 448. This feeds line $L_2$ to conductor 446, and thence through conductor 517, switch 426 and conductor 544 to triangle-drive starter 427. The normally closed contacts 407 on horizontal starter 392 being closed, line $L_1$ through conductor 393 feeds through contacts 407 and thence through conductor 406 to the other side of triangle-drive starter 427. This closes contacts 428 of the triangle-drive starter to feed line $L_1$ through conductors 393 and 551, contacts 428 and conductor 429 to the triangle-motion motor 161. The other side of triangle-motion motor 161 is connected directly to line $L_2$ through conductor 550. As the previous vertical step (upward) before making triangle 5L was not a full vertical step, being limited by sensing of the upper plate edge by limit switch 180, contacts 502 and 518 of the vertical-step-limit-switch cam 439 could not start the initial vertically downward step. Rather, the triangle-forming mechanism continued in the formation of the last top or overlapping triangle 5L, being energized through momentary contact 448, rather than contact 518, due to the partial vertical step, and then through 424 until the triangle-motion-stop contact opened as determined by rotation of cam 423. This triangle was made first as the horizontal-forward starter 392 has a time delay, the triangle-drive starter 427 is permitted to operate first. Once the triangle motion starts, cam 419 rotated and opend contacts 411 to prevent the horizontal-forward starter 392 from operating through conductor 412 until the triangle motion stops. When contacts 411 close, line $L_2$ is connected through push-button stop switch 400, normally closed right-horizontal-limit switch 416, the contacts 411 and conductor 412 to the forward-horizontal starter 392. At such time, line $L_1$ is connected through the then closed contacts 338 of top-edge-limit switch 180, through conductor 379, connection 351, bar 350, to the then closed contact 388, and thence through conductors 390 and 391 to the other side of the forward-horizontal starter. The forward-horizontal starter 392 closed contacts 394 to connect line $L_1$ through conductor 393, and closed contacts 394 to connect line L through conductor 393, and closed contacts 394 to the forward winding of the horizontal-drive motor 88. Line $L_2$ is connected directly through line 398 to the horizontal-drive motor 88. Thus actuated, the horizontal-drive motor 88, through horizontal-drive pinion 87 operated to move the main carriage 60 horizontally forward relative to the plate. This caused rotation of cams 343 and 344 through the variable-speed drive 353 to the present, illustrated position of the cams with the follower 352 of bar 350 received in cam notch 346. This latter action opened the forward-horizontal-starter circuit at contact 388, the forward-horizontal starter thereby opening contacts 394 and stopping operation of horizontal motor 88. Also, this action of forward-horizontal starter closed contacts 407 to connect line $L_1$ to the triangle-drive starter 427. At such time line $L_2$ was open to the triangle-motion starter 427. The above-described rotation of cam 344 effected closure of bar-352 contact 375, whereby line $L_1$ through closed contacts 338, conductor 379, bar 350, contact 375, and conductors 374 and 366 is connected to the down starter and memory 365. The upper side of the down starter and memory 365 was previously in closed connection with line $L_2$ through conductor 515, normally closed interlock contacts 449 on the up starter and memory 357, conductor 364, normally closed contacts 341 on the down-limit switch 183, conductor 355 and stop button 363. The down memory and starter 365 served to supply line $L_1$ through conductor 370d and contacts 382d to the vertical motor 106, line $L_2$ remaining open to the vertical motor at contacts 521 and 522. The down starter was held in circuit with line $L_1$ by conductor 376 and hold-down contacts 367 being maintained closed by the operator mechanism 384. The vertical motor remained to have line $L_2$ connected through conductor 437, open contacts 522, 521, and conductor 520. That is, the vertical-step relay 435 was yet to be closed to line $L_1$ at contacts 526 and 527, line $L_2$ being always directly connected to the vertical-step relay. This is so although the stop contacts 442 on the rotating-vertical-step-limit switch are closed at such time, the cam 440 not having rotated a full 360 degrees as only a partial vertical step occurred before the vertical-up-limit switch 86 operated.

When line $L_1$ was fed through contacts 388 of the horizontal-rotating-limit switch, as described hereinbefore, this energized coil 432 of the consecutive impulse coil set and release latching relay to open contacts 526 and 527. Thus, conductors 444 and 433 were open at contact 526, so that upon momentary closure of contacts 447 by operation of the down memory and starter 365, only the triangle-motion starter 427 was operated. The triangle-drive motor 161 moved cams 419, 300a and 423 to close contacts 424; and triangle motion proceeded to its completion being terminated upon opening of the latter contacts. At substantial completion of the triangle formation, but just before opening of contacts 424, the contacts 547 were closed by cam 300a which, through conductor 430, impulse coil 431 of the latching relay to close contacts 526 and 527. This completed a circuit from conductor 444, through conductor 433, contacts 526 and 527, and conductor 434 to the vertical-step relay 435. The latter will now operate to close contacts 521 and 522 and actuate the vertical-drive motor 106. The condition of the diagrammatic illustration of FIGURE 17 is such that the normally open contacts 521 and 522 are just beginning to close. Further, contacts 428 and 429 are just about to open, as are contacts 424 just about to open. Contacts 547 are momentarily closed, contacts 411 being just about to close, and contacts 382d are closed. Also, contacts 451 are open, contacts 367 being closed, contacts 337 being open, contacts 338 being closed but about to open, contacts 341 being closed, contacts 342 being open, contacts 407 being closed, and contacts 394, 410 and 542, and 409 all being open.

Contact 375 is closed and hot, but about to open at 338, while contact 387 is closed, but cold, and waiting for the vertically moving subcarriage 93 to reach its lowermost position in order to start the bottom cycle.

As noted hereinbefore, the conductor 444 was maintained in connection with line $L_1$ through closed contacts 504 and 442 during formation of triangles 5L and 6L, as the previous vertical step was only partial, rotation of cam 440 having been insufficient to open the contacts 504 and 442. If these contacts had been open due to a full vertical last step, and had the conductor 444 not been hot in connection with line $L_1$, the momentary-impulse contacts 300c and 547 on the triangle-motion-limit switch would have supplied current long enough to permit vertical-drive motor 106 to drive the cam 440 and effect closure of the contacts 504 and 442. Thus, relay 435 would have remained energized and held contacts 521 and 522 closed.

Following the illustrated condition of FIGURE 17, the vertical-drive motor 106 operates to rotate cam 440 clockwise sufficiently to open the contacts 504 and 442, thereby terminating the first downward-vertical step. The cams 440 and 439 are angularly arranged to provide sufficient time delay such that contacts 502 and 518 close and remain closed until the triangle starter operates and cam 423 has closed contacts 424. This continues the vertical-step cycle even after contact 442 has opened. This delay and overlap of contacts 442 and 518 by contacts 424 is operative in both directions of rotation corresponding to up-and-down-vertical movement.

Operation continues by alternate actuation of the triangle mechanism and vertical-drive mechanism to form the several triangles 7L, 8L, 9L and 10L, the vertical- and triangular-motion mechanisms each being actuated by termination of the other.

At the lower limit of vertical motion, bottom-edge-limit switch 183 and cam 343 operate in the same manner, respectively, as heretofore described in connection with the top-edge-limit switch 180 and cam 344 at the upper plate edge.

In operation, moving down toward the lower plate edge, the down starter and memory 365 and contacts 382d and 367 stay closed. This acts to remember that downward-vertical steps were being made during operation of the triangle mechanism. Contacts 359 and 382u maintain this continuity after the vertically movable carriage 93 moves upward away from the lower-limit switch 183. The interlock contacts 449 and 451 prevent actuation of both vertical starters at the same time, as does the mechanical interlock 385.

Manual-push-button-start switches are provided at 368, 361, 443 and 425, as well as at 413 to start operation if there is interruption. The manual-start switches 368, 361, 443, 425 and 413, 414 and 403 are all normally open. Operation may be stopped by actuation of the appropriate normally closed stop switches 426, 362, 363, 400, 404 and 453.

At the right-hand edge of a plate being tested, limit switch 181 senses the plate edge and is operated to open normally closed stop switch 416 to prevent right-horizontal movement of the testing heads beyond the plate. Further, the right-horizontal-limit switch 181, by means of normally open down-starter switch 417 and up-starter switch 418 effects vertical-downward or -outward movement, respectively, from the top or bottom plate edge, even though a full horizontal step has not been made and the contact 375 or contact 373 has not been closed. The interlock switches 449 and 451 prevent actuation of both up and down starters simultaneously or in alternate hunting action whenever the right-horizontal-limit switch 181 senses the plate edge or a plate is absent from the apparatus. To permit manual raising and lowering of the subcarriage 93, the normally closed up-stop-limit switch 337 is connected in circuit with hold-down switch 359 to permit raising of the subcarriage by manual operation of switch 361, and down normally closed stop-limit switch 341 is connected in circuit with hold-down switch 367 for manual lowering by switch 368. In the absence of a plate 51, manual lowering of tthe subcarriage may be accomplished as above, but for manual raising of the subcarriage the now open limit-switch contact 337 must be by-passed by a momentary normally open contact mechanically coupled to switch 361.

In order to return the carriage 60 leftward at the end of a completed operation, for starting another operation, there is provided the reverse-horizontal starter 402. This action is initiated by closing switch 403 to feed line $L_2$ to the reverse-horizontal starter 402 from conductor 398. Line $L_1$ is connected to the reverse-horizontal starter 402 through conductor 193. Left-horizontal motion of carriage 60 is automatically stopped by left-end-horizontal-limit switch 405, and can be manually stopped by operation of normally closed switch 404. Upon momentary closure of manual-reverse-start switch 403, the starter 402 is held in by closure of hold-down switch 410. It will be appreciated that line $L_1$ is fed through conductor 393, conductor 541 and the closed contact 409 to the reverse-winding conductor 408 of the horizontal motor 88. Suitable mechanical interlocks may prevent simultaneous actuation of forward-horizontal starter 392 and reverse-horizontal starter 402.

As there may, in certain circumstances, be difficulty in accurately positioning a plate in the apparatus with the left plate edge at a precise location, a synchronizing clutch may be employed in the horizontal-drive transmission. Also, it is appreciated that suitable stop or disconnection means may be associated with certain starters and relays to prevent a vertical-stop movement and triangle formation upon reverse-horizontal motion of carriage 60. Such as the addition of a normally closed interlock in line 406 mechanically connected to the reverse-horizontal starter 402.

Moreover, the above-described apparatus and electrical circuitry may omit the triangle-formation means if only vertical and horizontal stops are desired, as by using time-delay contacts or manual actuation after suitable delay. Such delays may be obtained in the above apparatus, without modification, by manual actuation of both the vertical-stop switch 453 and triangle-stop switch 226.

While finger-type switches, relays and cams have been shown and described as an operative embodiment of the instant control circuitry, it is of course appreciated that other elements may be substituted therefor, such as proximity switches, logic networks, and the like.

In order to scan the entire surface of a plate, the speed ratio of drive 353 is adjusted so that the horizontal steps are approximately equal to the width of the sensing elements or transducers, and the actions of vertical-step cams 439 and 440, and the patternmaking cams 423, 300a and 419, and their associated circuits are eliminated. Also by slight modification, the plate surface may be scanned in horizontal bands or stripes with vertical steps, to achieve the desired degree of testing up to and including the entire surface.

From the foregoing, it is seen that a testing method and apparatus are provided which fully accomplish their intended objects and are well-adapted to meet practical conditions of use.

Although the present invention has been described in some detail by way of illustration and example for purposes of clarity of understanding, it is understood that certain changes and modifications may be made within the spirit of the invention and scope of the appended claims.

What is claimed is:

1. A testing mechanism comprising plural spaced eccentric rotary means arranged in a predetermined polygonal pattern, an elongate endless flexible element trained about and in operative connection with said eccentric rotary means for oscillatory movement about the closed path of said pattern, and test means carried by said elongate element facing normal to the plane of said pattern for movement therewith to test in an oscillatory path along said pattern.

2. Plate-testing apparatus comprising a stand for supporting a plate in upstanding relation, an elongate vehicle extending in one direction across said stand and mounted for movement in a transverse direction on one side of said plate, a carriage mounted on said vehicle for movement longitudinally thereof, test means carried by said carriage for scanning said plate, and pattern-generating means on said carriage comprising a plurality of rotary members on said carriage, and an endless member trained about said rotary members, said test means being mounted on said endless member for movement about the configuration thereof.

3. Test apparatus comprising support means for supporting a plate in stationary upstanding position to be tested, a carriage, means mounting said carriage on one side of and for movement relative to said plate along one face thereof, line-testing means carried by said carriage, spot-testing means carried by said carriage, said line-testing means being mounted for movement with said carriage and movement along a predetermined closed configuration relative to said carriage, said spot-testing means being mounted for movement only with said carriage, and means for effecting movement of said line-testing means along said predetermined closed configuration relative to said carriage when said carriage is stationary.

4. Plate-testing means comprising a carriage mounted for movement along one surface of a plate, and a testing unit unit carried by said carriage, said testing unit comprising a chamber mounted on said carriage positioned to face toward a plate, said chamber having an opening in one side facing the plate, a sonic source in said chamber positioned for direction toward said plate, biasing means biasing said sonic source to a position toward but spaced from said plate, and fluid-couplant-supply means connected to said chamber for conducting couplant to the interior of said chamber, said opening communicating and passing couplant between the chamber and plate to lubricate relative movement therebetween, said biasing means being defined by a telescopically movable chamber section, the sonic source being contained in said movable chamber section, and the sonic source and interior of said movable chamber section being configured to receive the fluid couplant and be hydraulically biased toward said plate.

5. Plate-testing apparatus according to claim 2, said rotary members being eccentric to impart oscillatory motion to said endless member and test means.

6. Test apparatus according to claim 3, said carriage being movable horizontally and vertically relative to said support means for scanning said one face of said plate, (References on following page)

References Cited by the Examiner

UNITED STATES PATENTS

| | | | |
|---|---|---|---|
| 1,077,815 | 11/13 | Droitcour | 74—37 |
| 1,497,406 | 6/24 | Robertson | 74—37 |
| 2,240,505 | 5/41 | Lessig | 73—67.3 X |
| 2,645,938 | 7/53 | Billstein | 73—67.8 X |
| 2,678,559 | 5/54 | Drake | 73—67.8 |
| 2,725,491 | 11/55 | Haswell | 310—8.7 |
| 2,921,465 | 1/60 | Cook | 73—67.8 X |
| 2,956,185 | 10/60 | Von Stocker | 73—67.8 X |
| 2,969,671 | 1/61 | Sproule | 73—67.9 |
| 2,989,864 | 6/61 | Bamford | 73—67.8 |
| 3,023,611 | 3/62 | Howry | 73—67.9 X |
| 3,111,027 | 10/63 | Moffat et al. | 73—67.8 |
| 3,121,326 | 2/64 | Klatchko | 73—67.8 |

FOREIGN PATENTS 893,459  1/44  France.
865,573  4/61  Great Britain.

OTHER REFERENCES

Manthey et al. (German application), 1,060,626, printed July 2, 1959, KL. 42k.

RICHARD C. QUEISSER, *Primary Examiner.*

JOHN P. BEAUCHAMP, *Examiner.*